United States Patent [19]

Ohmura

[11] 4,019,190
[45] Apr. 19, 1977

[54] ACCESSORY FOOT FOR CAMERA ACCESSORIES
[75] Inventor: Hiroshi Ohmura, Tokyo, Japan
[73] Assignee: Fuji Photo Film Co., Ltd., Minami-ashigara, Japan
[22] Filed: Aug. 5, 1975
[21] Appl. No.: 602,073
[30] Foreign Application Priority Data
Aug. 21, 1974 Japan .............. 49-99688[U]
[52] U.S. Cl. .............. 354/145; 354/202; 354/295; 240/1.3
[51] Int. Cl.² .............. G03B 15/05
[58] Field of Search .......... 354/129, 141, 145, 202, 354/295, 354; 240/1.3; 352/243, 244
[56] References Cited
UNITED STATES PATENTS

| 3,338,146 | 8/1967 | Schmidt .............. 354/145 |
| 3,463,069 | 8/1969 | Kremp et al. .............. 354/141 |
| 3,782,258 | 1/1974 | Boekkooi et al. .............. 354/126 |
| 3,917,944 | 11/1975 | Eisenberger .............. 240/1.3 |

Primary Examiner—L. T. Hix
Assistant Examiner—Alan Mathews
Attorney, Agent, or Firm—Gerald J. Ferguson, Jr.; Joseph J. Baker

[57] ABSTRACT

An accessory foot fixed to an accessory such as a strobo flash light unit has a demountable foot member in addition to a standardized foot part. The demountable foot member is removably mounted to the foot to elongate the length of the standardized foot part to be inserted into a shoe fixed to a camera body. The elongated foot is engaged with a specially designed long accessory shoe to firmly hold the accessory on the camera body. When the accessory is mounted to a camera body with an ordinary standard accessory shoe, the demountable accessory foot member is removed from the accessory so that the standardized foot part of the foot may be accommodated with the standard accessory shoe.

5 Claims, 4 Drawing Figures

ACCESSORY FOOT FOR CAMERA ACCESSORIES

BACKGROUND OF THE INVENTION

1. Field of the Invention

This invention relates to an accessory foot of an accessory for cameras, and more particularly to an improvement in the structure of a foot of an accessory such as a strobo flash light unit, a telescopic view finder, an exposure meter or the like to be mounted on a shoe fixed to the body of a camera.

2. Description of the Prior Art

In the conventional photographic cameras, an accessory such as a strobo flash light unit, an additional view finder or the like is mounted on the shoe of a camera fixed to the top face of the camera body. Recently, pocket size cameras of thin body have been developed and widely commercialized. The thin pocket size cameras are usually held in the horizontal position with one hand holding either side end. In the pocket size cameras wherein a flash light device such as a strobo flash unit is fixed to one side end of the camera body, the flash light device is held by one hand and the camera body is held by the other hand. The accessory such as a flash light device is usually mounted on the camera body by shoe-and-foot engagement wherein a foot fixed to the accessory is engaged with a shoe fixed to the camera body.

When the flash light device or other kind of accessory mounted on the camera body on one side end thereof is held by one hand and the camera is aimed at an object to be photographed, the camera body and the accessory are not supported stably since the conventional standardized shoe-and-foot engagement which was originally designed for accessories mounted on the top face of the camera is not sufficiently firm. The unstable hold of the camera often results in blurred photographs.

SUMMARY OF THE INVENTION

In view of the unstable hold of the camera in the conventional cameras with an accessory which results from the standardized shoe-and-foot engagement, the primary object of the present invention is to provide an accessory foot for an accessory for cameras which establishes a firm engagement between a shoe provided on the camera body and the foot.

Another object of the present invention is to provide an accessory foot for an accessory such as a flash light device which not only firmly engages with a specially designed shoe, but also is engageable with an ordinary standardized shoe provided on the camera body.

Still another object of the present invention is to provide an accessory foot for an accessory such as a flash light device which facilitates the mounting of the accessory on the camera body.

The above objects are accomplished by providing a demountable additional foot member adjacent to the conventional standardized foot part of an accessory foot so that the foot may be accommodated with both the conventional standardized accessory shoe and the specially designed accessory shoe.

DESCRIPTION OF THE PREFERRED EMBODIMENTS

Figure 1:
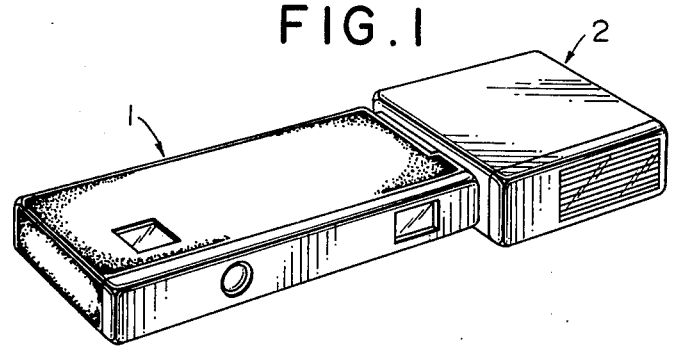
FIG. 1 is a perspective view of a camera with a strobo flash light unit attached thereto.

FIG. 1 illustrates a pocket size camera 1 with a strobo flash light unit 2 attached thereto. The flash light unit 2 is mounted on one side end of the camera body 1 and forms a thin camera configuration together with the camera body 1 to be held by both hands in the horizontal position.

Figure 2:
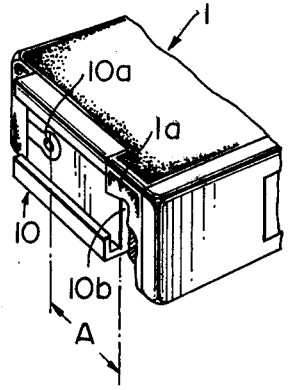
FIG. 2 is a fragmentary perspective view showing an accessory shoe which is specially designed for use with the foot of this invention.

The camera body 1 is provided on one side end 1a thereof, as shown in FIG. 2, with an accessory shoe 10 which is specially designed for firm engagement. The accessory shoe 10 has a larger length than the standardized shoe. The distance A between the contact 10a for synchronization of strobo flash with shutter release and the back end 10b of the shoe 10 is made longer than the standard distance. The standard distance is indicated at B in FIG. 3.

Figure 3:
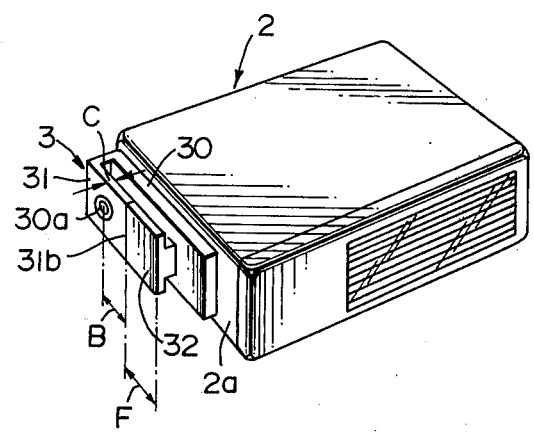
FIG. 3 is a perspective view of a strobo flash light unit provided with the accessory foot in accordance with the present invention and FIG. 4 is a perspective view of a strobo flash light unit provided with the accessory foot in accordance with the present invention showing the state where a demountable foot member of the foot is removed.
Figure 4:
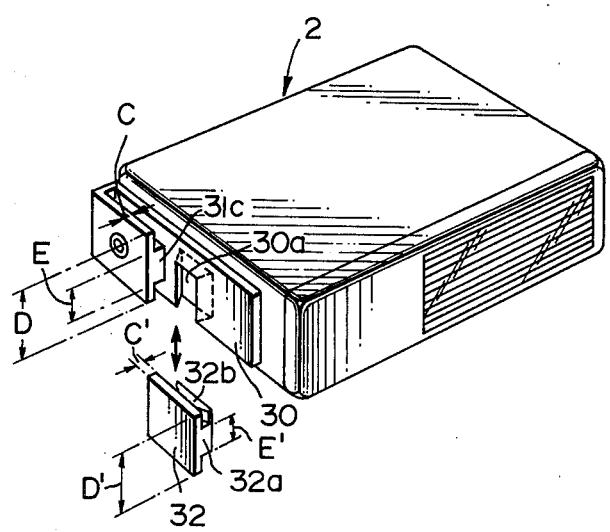

One embodiment of the accessory foot to be engaged with the accessory shoe 10 is illustrated in FIGS. 3 and 4. FIG. 3 shows the strobo flash unit 2 shown in FIG. 1 which is provided with an accessory foot 3 in accordance with the present invention. The accessory foot 3 is comprised of a base 30 fixed to the bottom face 2a of the flash light unit 2, a standardized foot part 31 extending in parallel to said base 30 and having a contact 30a to be electrically brought into contact with said contact 10a of the shoe 10, and a demountable foot member 32 provided adjacent to the standardized foot part 31. The distance B between the center of the contact 30a and the back end 31b of the standardized foot part 31, the thickness C of the edge of the standardized foot part 31, the width D of the standardized foot part 31 and the width E of a thicker part 31c of the standardized foot part 31 are all equal to the standard dimensions as prescribed in JIS B7101.

The demountable foot member 32 is designed to elongate the standardized foot part 31 in a direction parallel to the base. The length F of the demountable foot member 32 to elongate the standardized foot part 31 in is determined so that the sum of said distance B and the length F becomes equal to said distance A of the shoe 10. The thickness C' of the edges of the member 32, the width D' thereof and the width E' of the thicker part 32a thereof are all equal to or slightly smaller than said thickness C, width D and width E of the standardized foot part 31 so that the foot 3 comprised of the standardized foot part 31 and the demountable foot member 32 may be accommodated in the long shoe 10 as shown in FIG. 2.

The demountable foot member 32 has a mount foot 32b integrally fixed thereto which is engaged with a mount shoe 30a formed in the base 30. The mount foot 32b is generally square shaped and the mount shoe 30a is a dove-tail shaped recess which is open at an end on one side of the base 30 to receive the mount foot 32b therein. The mount foot 32b is preferably integrally molded together with the demountable foot member 32.

The demountable foot member 32 is slidable in the direction indicated by an arrow in FIG. 4 and mounted on and demounted from the base 30. When the demountable foot member 32 is mounted on the base 30 as shown in FIG. 3, the member 32 forms an elongated foot together with the standardized foot part 31. The elongated foot 3 establishes a firm engagement with the specially designed long shoe 10 as shown in FIG. 2. With the firm engagement, the camera body 1 and the accessory such as the strobo flash light unit 2 are firmly connected and accordingly the camera can be stably held by hand.

When it is desired to mount the accessory such as the strobo flash light unit 2 on a camera having an ordinary standardized accessory shoe, the demountable foot member 32 is removed from the base 30 to make the foot become of standard shape.

Thus, the accessory foot 3 in accordance with the present invention can be engaged with both the conventional accessory shoe and the specially designed long accessory shoe.

I claim:

1. An accessory foot fixed to an accessory for cameras to be engaged with an accessory shoe fixed to the body of cameras comprising a base fixed to the accessory, said base extending along the bottom face of the accessory, a standardized foot part fixed to said base and having a main portion spaced from and extending in a direction parallel to said base, said standardized foot part having an electric synchronizing contact to be put into contact with an electric contact provided on the accessory shoe on the camera body, and a demountable foot member removably mounted to said base, said demountable foot member being so positioned on said base and of such a shape as to elongate the main portion of the standardized foot part in said direction parallel to said base to make the foot longer.

2. An accessory foot as claimed in claim 1 wherein said demountable foot member has substantially the same width and thickness as the standardized foot part.

3. An accessory foot as claimed in claim 1 wherein said demountable foot member has a mount foot and said base has a mount shoe, said mount foot being slidable into said mount shoe to bring the demountable foot member in alignment with the standardized foot part.

4. An accessory foot as claimed in claim 3 wherein said mount shoe of said base is dove-tail shaped and open at an end thereof on one side of said base.

5. An accessory foot as claimed in claim 3 wherein said mount foot of said demountable foot member is integrally molded with said demountable foot member.

* * * * *